Patented Apr. 13, 1943

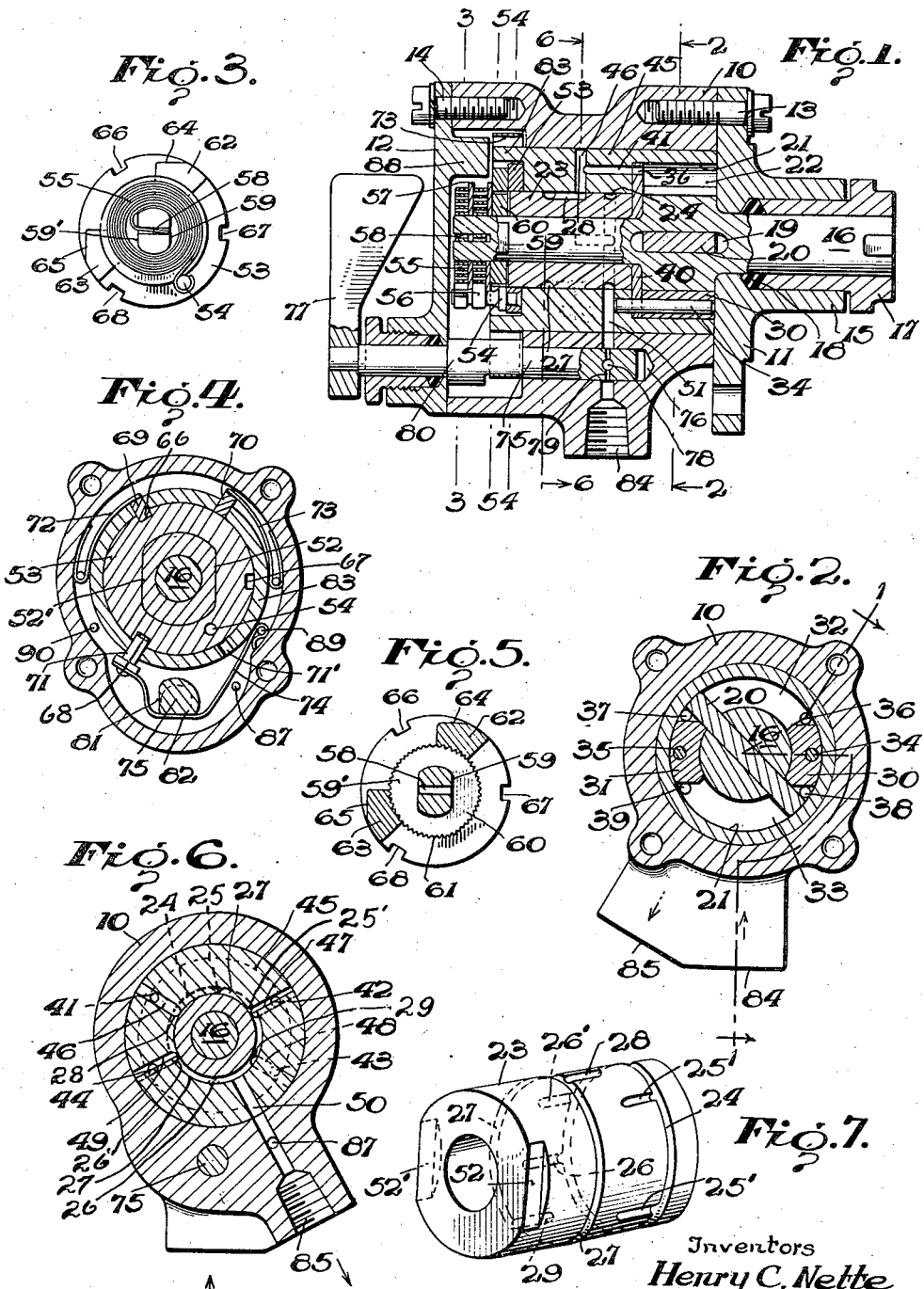

2,316,356

UNITED STATES PATENT OFFICE 2,316,356

FLUID MOTOR

Henry C. Nette, Rutherford, and Myron L. Taylor, West Englewood, N. J., assignors to Bendix Aviation Corporation, South Bend, Ind., a corporation of Delaware Application June 6, 1941, Serial No. 396,918

6 Claims. (Cl. 121—99)

This invention relates to fluid motors, and more particularly to a hydraulically actuated motor having an oscillating working cycle.

It is an object of the present invention to provide a fluid motor wherein the arc of the working stroke may be adjusted for different working conditions.

It is another object of the present invention to provide a fluid motor wherein a novel reversing mechanism is employed for changing the direction of the working stroke of the motor.

It is a further object of the invention to provide a fluid motor of the oscillatory type that is suitable for use as a windshield wiper drive, and which has means for positively locking the motor against oscillation by an outside force when the motor is not in operating condition.

Other objects will appear from a study of the following specification when made in conjunction with the attached drawing, throughout which like numerals designate like parts.

Fig. 1 is a longitudinal sectional view of the motor of the present invention.

Fig. 2 is a cross-sectional view of the motor taken along line 2—2 of Fig. 1.

Fig. 3 is an end elevational view of a detail shown in section in Fig. 1, taken along the line 3—3 of Fig. 1.

Fig. 4 is a cross-sectional view taken along the line 4—4 of Fig. 1.

Fig. 5 is an end elevational view, taken along the line 5—5 of Fig. 1, showing a detail of the present invention.

Fig. 6 is a cross-sectional view, taken along the line 6—6 of Fig. 1; and

Fig. 7 is a perspective showing of the valve utilized in the embodiment of the invention shown in Fig. 1.

As shown more particularly in Fig. 1, 10 is a generally cylindrical housing member of cast aluminum or other suitable material, having a forward end plate 11 of cast aluminum or other suitable material, and a rear end plate 12 of generally similar construction. Plates 11 and 12 are securely fastened to housing 10 in a fluid-tight manner, by means of a plurality of studs 13 and 14. Plate 11 has a cylindrical boss portion 15, through which a driving shaft 16 projects, and which also accommodates a packing gland 17, which may be screw-threaded for compressing a gasket 18, of any suitable material, thus forming a fluid-tight seal about shaft 16. Shaft 16 has an elongated aperture or slot 19, carrying a vane 20 in a close, but sliding fit, with the interior cylindrical wall 21 of a chamber 22. Shaft 16 is journaled at one end in a metallic sleeve valve member 23, which has, as shown more particularly in Fig. 7, a circumferential groove 24, which is intersected by longitudinally extending grooves 25, 25' and 26 and 26'. Grooves 25 and 25' are located 60 degrees apart and groove 25' is 120 degrees from groove 26. Grooves 26 and 26' are 60 degrees apart, and groove 26' is 120 degrees from groove 25. Sleeve member 23 has a second circumferential groove 27 formed therein, with longitudinally extending grooves 28 and 29 intersecting it at positions spaced 180 degrees apart, and groove 28, 60 degrees from grooves 25 and 26', and groove 29, 60 degrees from grooves 25' and 26. These grooves are angularly related in this manner for a reason to be stated later.

As shown more particularly in Fig. 2, chamber 22 is divided, by means of shaft 16 and partition members 30 and 31, into two cells 32 and 33. Partitions 30 and 31 are retained in position by means of dowel members 34 and 35, respectively, and cell 32 contains ports 36 and 37 on opposite sides of vane member 20, closely adjacent partitions 30 and 31. Cell 33 has port members 38 and 39 similarly positioned therein.

Chamber 22 contains a liner or bearing plate 40, over which vane 20 is movable in a fluid-tight relation. Four channel members or passageways 41, 42, 43 and 44, as shown particularly in Figs. 1 and 6, extend longitudinally through a cylindrical collar portion 45, formed as an extension of the surface 21 of chamber 22. Four radially disposed channels or passageways 46, 47, 48 and 49 intersect the channel members 41, 42, 43 and 44, respectively. As shown in Fig. 1, channel member 46 is in communication with groove 28, and therefore, with circumferential groove 27 of the sleeve valve member 23. Circumferential groove 27, as will be noted from Fig. 6, is in direct communication at all times with the outlet passageway 50, which is formed in housing member 10. Circumferential groove 24 is at all times in communication with the inlet passageway 51, as will be evident from an inspection of Fig. 1.

Sleeve member 23 has two flat ledge portions 52 and 52', as shown in Figs. 4 and 7, formed thereon, to which is keyed an annular ring member 53, as shown in Fig. 1. Annular ring 53 also carries an anchor post 54, to which are connected the outer ends of the spiral springs 55 and 56. These springs are separated from each other by means of a thin partition 57. The inner ends of springs 55 and 56 are swaged within a transverse slot 58, formed in the left end of shaft 16, as viewed in Fig. 1. Shaft 16 has flat ledge members 59 and 59', as shown in Figs. 1, 3 and 5, formed therein, to which is keyed an apertured disc member 60. Disc 60 has a series of serrations 61 formed on its periphery, and mounted thereon with corresponding serrations, are cam members 62 and 63, having cam surfaces 64 and 65 respectively. Annular ring member 53 has three recesses 66, 67 and 68, spaced at intervals of 120 degrees on its periphery. These recesses are adapted to receive certain of the detents 69, 70 and 71, as will be later described. Detents 69 and 70 are angularly spaced by 60 degrees. These detent members are urged radially inwardly by means of leaf springs 72, 73 and 74, respectively.

In order to control the operation of the motor, a cut-off valve, having a spindle portion 75 fitted within a bore 76, is provided with a handle member 77. Spindle 75 has two angularly related bores 78 and 79, drilled transversely thereof in the plane of fluid inlet passageway 51. Spindle 75 also carries a cam member 80, having two flat cam surfaces 81 and 82. An inspection of Fig. 4 shows that leaf spring 74 bears against surface 82 for a function which will be described later.

It will be seen from Figs. 1 and 4 that an annular flange 83 is formed integrally with collar portion 45, and extends axially a distance sufficient to embrace both annular plate 53 and disc 60, carrying cam members 62 and 63. From Fig. 4, it will be seen that holes are formed in member 83 for slidably engaging detents 69, 70 and 71. As shown, hole 71' does not contain a detent, but its purpose will be later explained.

Cam members 62 and 63 are not fastened to disc member 60, but are maintained in position by means of an arcuate boss member 88 and the flange portion 83, the inner diameter of which is equal to the diameter of annular ring 53, with a small clearance. With end plate 12 removed, cam members 62 and 63 may be removed axially from disc 60, and replaced at any desired points in the periphery of disc 60. By this construction, the arc of the working stroke of the motor may be adjusted, as will be described later.

The novel motor of the present invention is intended principally for use as a drive for a windshield wiper on aircraft. When so used, shaft 16 may be provided with a slot or other type of terminal adapted to be connected to a gear box carrying the windshield wiper blade. Usually, the gear box contains gears for the purpose of increasing the arc of travel of the blade over the arc of travel of the motor shaft. A suitable source of pressure, such as a hydraulic pump, may be connected by conduits (not shown) to the screw-threaded bore 84, which acts as a terminal for inlet passage 51, and the fluid discharge from the motor may be returned to a sump (not shown) by means of a suitable conduit connected to the screw-threaded bore 85, which is open to the outlet or exhaust passageway 50. In order to prevent the accumulation of hydraulic fluid under high pressure about the springs 55 and 56, and members 53 and 60, relief to the exhaust side of the motor is provided. A small passageway 87 is drilled through the bottom portion of body 10 opening into the exhaust or outlet passageway 50, as shown particularly in Fig. 6.

Figs. 1 and 6 indicate that the motor is shown in its "off" or locked position. If handle 77 is turned counter-clockwise from the position shown in Fig. 1, with cam face 82 of spindle 75 in engagement with spring 74, to the "on" position wherein the cam portion 81 of shaft 75 is in engagement with leaf spring 74, and wherein the large bore 78 is in communication with inlet passageway 51, detent 71 will be lifted from its recess 68, permitting normal valve reversal and vane 20 will be free to rotate under pressure of the hydraulic fluid in chamber 22, and the fluid will be exhausted or withdrawn from chamber 22 and the motor through outlet passageway 50. When vane 20 causes rotation of shaft 16, this rotation will continue until one or the other of cam faces 64 or 65 engages with either of the detents 69 or 70, forcing the detent to be withdrawn from its recess 66 in annular ring 53. Since rotation of shaft 16 stores energy in the springs 55 or 56, when the restraining detent is disengaged from its recess in annular ring 53, the energy in the springs will rotate sleeve valve 23 with a snap action, now causing the fluid flow through chamber 22 to be reversed. Since the cam members 62 and 63 govern the instant of reversal of sleeve valve 23, then it will be apparent that by placing cam members 62 and 63 in predetermined positions about the periphery of disc 60, the length of the arc of the windshield wiper blade may be controlled.

In the condition of the motor shown in the drawing, when fluid under pressure enters through passageway 51, it circulates throughout circumferential groove 24, and enters chamber 22 through grooves 25 and 26 (Fig. 7), one of which is in communication with channels 44 and 49, and the other of which is in communication with channels 42 and 47, so that the fluid enters cells 32 and 33 through ports 37 and 38, respectively. During the working stroke that ensues, the spent fluid is exhausted through ports 36 and 39, which are in communication with channels 41, 46 and 43, 48, respectively. At the end of the working stroke, when the cam member 63 has caused detent 69 to be released, so that sleeve valve 23 is rotated 60 degrees, ports 36 and 39 now become inlet ports to chamber 22, and these ports are in communication with inlet passageway 51 and circumferential groove 24, through grooves 25' and 26'. At the same time, ports 37 and 38 now become exhaust or outlet ports, being in communication with passageway 50 and circumferential groove 27, through grooves 28 and 29, which are in communication with channels 42, 47 and 44, 49, respectively. The fluid under pressure then forces vane 20 to rotate in the opposite direction, until cam member 62 causes reversal of sleeve valve 23 upon disengagement of the detent 70.

Since detents 69 and 70 are 60 degrees apart, the provision of grooves 25' and 26' 120 degrees from grooves 25 and 26, respectively, satisfies the condition that two grooves, one in communication with the inlet port of cell 32 and the other in communication with the inlet port of cell 33, are in operation for each 60 degree swing of sleeve valve 23.

Operation of the motor is stopped upon restoration of the handle 77 to the position shown, as this restores cam surface 82 to contact with leaf spring 74, and permits the insertion of detent 71 into the slot member 68. At the same time, the large bore 78 is turned at right angles to inlet passageway 51, and the small hole or bore 79 is turned into alignment with passageway 51 to allow a decreased amount of fluid to continue to flow into chamber 22. With detent 71 engaged, as shown in Fig. 4, it is not possible for sleeve member 23 to move with respect to shaft 16, but if an external force, such as that due to the pressure of air against a windshield wiper blade of an aircraft, is sufficiently large, then shaft 16 tends to rotate in response to the pressure, and the windshield wiper blade creeps from its locked position. In order that the blade may be held motionless, regardless of external air flow, when the motor is not operating, a small amount of fluid under pressure is permitted to flow through the small bore 79 to exert sufficient pressure on vane 20 to overcome the force due to the flow of air against the blade of the wiper.

Whenever detent 71 is permitted to engage with slot 68, then the last stroke of the motor is always in the same direction, for example, counter-clockwise, and thus, the wiper blade comes to a stop on one side, for example, the right side of the windshield. If it is desired to have the blade stop on the left side of the windshield, spring 74 carrying detent 71 is removed from pin 89 and placed upon pin 90. Detent 71 then extends into a hole 71' formed in flange member 83, and then, when the motor is stopped, detent 71 will engage recess 67 as it passes under hole 71'. With a suitable gear ratio in the gear box (not shown) of the windshield wiper, the windshield wiper blade will then come to rest at the left side of the windshield.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

We claim:

1. A hydraulic motor of the oscillatory type having a shaft driven by fluid under pressure, a cylindrical chamber coaxially about said shaft, a vane rotatably carried on said shaft and in sealing engagement with the inner surface of said chamber, said chamber having a wall at each end thereof, said shaft carrying one end of each of two oppositely loaded spiral springs, a sleeve member about said shaft on one end thereof adjacent said chamber, means cooperating with said shaft for dividing said chamber into two cells, two fluid ports, on opposite sides of said vane in each of said cells, fluid passageways leading from said ports to said sleeve member, channel members in said sleeve member for selectively directing fluid into one and out of the other of said ports in each cell, a disc member carried by said shaft, said disc member having serrations formed in its periphery, two cam members having serrations mounted upon the serrations of said disc member, a plate member carried by said sleeve and rotatable therewith, means carried on said plate member for anchoring thereto the outer ends of said spiral springs and spring-urged detent means for permitting one of said spiral springs to become loaded upon rotation of said shaft in one direction, said detent means being released by one of said cam members to cause said spring to rotate said sleeve member and reverse the direction of fluid flow through said cells, additional detent means for permitting the other of said spiral springs to become loaded during rotation of said shaft in an opposite direction, said additional detent means being released by the other of said cam members to rotate said sleeve to reverse the direction of fluid flow through said cells, the angle of rotation of said shaft being determined by the angular separation of said cam members.

2. A hydraulic motor of the oscillatory type having a shaft driven by fluid under pressure, a cylindrical chamber disposed coaxially about said shaft, a vane rotatably carried by said shaft and in sealing engagement with the inner surface of said chamber, said chamber having a wall at each end thereof, said shaft carrying oppositely loaded spring members, a sleeve member on said shaft adjacent said chamber, means cooperating with said shaft for dividing said chamber into a plurality of cells, a fluid port on each side of said vane in each of said cells, fluid passageways leading from said ports to said sleeve member, channel members in said sleeve member for selectively directing fluid into one and out of the other of the ports in each of said cells, cam members carried by said shaft, said cam members being adjustable about said shaft, detent means engageable by said cam members at predetermined points in the angular travel of said shaft, said detent means, when thus engaged, acting to rotate said sleeve member and reverse the direction of fluid flow through said channels and said ports and thus reverse the direction of rotation of said shaft.

3. A hydraulic motor having a shaft driven by fluid under pressure, a cylindrical chamber disposed coaxially about said shaft, a vane rotatably carried by said shaft and in sealing engagement with the inner surface of said chamber, a sleeve member on said shaft adjacent said chamber, means cooperating with said shaft for dividing said chamber into a plurality of cells, a fluid port on each side of said vane in each of said cells, fluid passageways leading from said ports to said sleeve member, channel members in said sleeve member for selectively directing fluid into one and out of the other of said ports in each of said cells, energy storage means charged by motion of said shaft in one direction to impart motion to said sleeve member and cam means operated by said shaft for releasing said sleeve member for such motion, said cam members being adjustable for governing the angular motion of said shaft.

4. A fluid motor having a shaft driven by fluid under pressure, means for reversing the direction of flow in said motor for changing the direction of rotation of said shaft, including spring means actuated by said shaft to store energy upon rotation of said shaft, a working chamber having a vane therein carried by said shaft, ports opening into said chamber on opposite sides of said vane, a sleeve carried upon said shaft adjacent said chamber, channel members therein for selectively connecting said ports for inlet and outlet of fluid under pressure, a plurality of cams having means whereby the angular interval between each of said cams may be varied, and means operable by each of said cams for imparting the energy stored by said spring means to said sleeve for reversing the direction of fluid flow through said chamber, thus reversing the direction of rotation of said shaft.

5. A fluid motor of the oscillatory type comprising a working shaft, a chamber, a vane in said chamber, said vane being connected to said shaft, fluid ports within said chamber on opposite sides of said vane, a valve having channel means therein for selectively connecting said ports to the input and the output of fluid under pressure, means for actuating said valve including cam members carried by said shaft, spring means actuated by said shaft to store energy, and means engageable by said cam members at predetermined points in the rotation of said shaft to impart the energy stored in said spring means to said valve, to reverse the direction of rotation of said shaft, said cam members being adjustable to control the amount of angular motion of said shaft.

6. A fluid motor of the oscillatory type comprising a cylindrical chamber, a shaft passing centrally therethrough, a vane connected to said shaft and extending radially across said chamber in sealing engagement with the interior wall thereof, ports opening into said chamber on opposite sides of said vane, valve means exteriorly of, but adjacent said chamber and in communication with said ports to connect them alternately to a source of fluid pressure and to a fluid return, spring means for storing energy during angular movement of said shaft in each direction, and cam members carried by said shaft to oscillate therewith and actuate said valve to reverse the flow of fluid through said ports, said cam members being adjustable angularly to regulate the angular travel of said shaft.

HENRY C. NETTE.
MYRON L. TAYLOR.